(No Model.)
A. MUIR.
MACHINE FOR DRAWING CORKS.
No. 251,455. Patented Dec. 27, 1881.
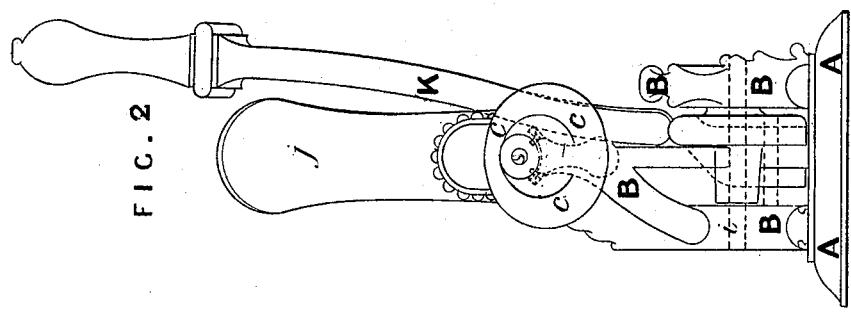
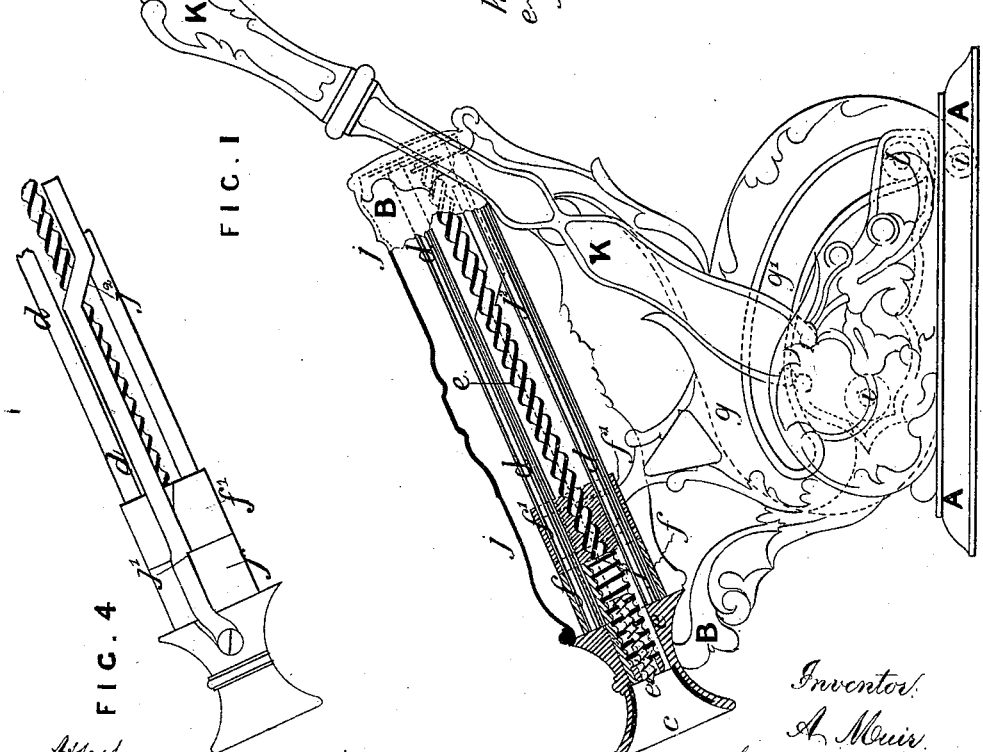
Attest.
W. A. Bertram
Dr. L. M. Barclay
Inventor.
A. Muir.
by
R. D. Williams
Attorney.

UNITED STATES PATENT OFFICE.

ANDREW MUIR, OF HARBORNE, COUNTY OF STAFFORD, ENGLAND.

MACHINE FOR DRAWING CORKS.

SPECIFICATION forming part of Letters Patent No. 251,455, dated December 27, 1881.

Application filed August 22, 1881. (No model.) Patented in England August 18, 1880.

*To all whom it may concern:*

Be it known that I, ANDREW MUIR, of Harborne, in the county of Stafford, England, have invented a new and useful Machine for Drawing Corks, which is set forth in the following specification, reference being had to the accompanying sheet of drawings.

My invention has reference to an improved machine for drawing corks by a single operation of the hand, whereby corks may be drawn with the greatest rapidity and with a minimum expenditure of power, besides the insurance of much greater safety in case the bottle breaks—as it sometimes does—during the process of drawing; and not only is the danger in case of a breakage lessened, but the liability of breaking the bottle during the process of drawing is much reduced, as the whole process is completed during one steady stroke of the hand.

The drawings show two main views, viz: Figure 1, a side elevation, and Fig. 2 a front elevation. Fig. 3 is a section through the nut and guide-rods, and Fig. 4 is for the purpose of showing the hook which retains the back nut while the screw is forced home in the cork.

The machine stands upon the base A, which may either be screwed down to a counter or table or made sufficiently stable in itself to stand steadily, and all the different parts of this machine are secured to this single base.

B is the bracket for supporting the cylinder or mouth $c$ and the outer casing, $j$.

$e$ is the double-threaded screw, carrying the corkscrew $e'$ at its front end.

$f'$ is the nut which slides freely upon the slides $d$, for revolving the screw $e$, and $f$ is the partly-stationary nut, which only moves sufficiently to withdraw the cork.

$g$ is a reeling-lever, which works upon the center $i$, and is operated by the hand-lever K, which has an arm carrying the roller $l$, working in the curved slot $g'$ of the lever $g$, so that as the hand-lever K is brought forward the reeling-lever $g$ is carried backward by the point $g^2$, which works freely in the bearings $h$ of the sliding nut $f'$.

The guides $d\ d$ tie the parts of the machine together by being fastened into $c$ at one end and onto the bracket B at the other end, thus constituting stiff guides for both the nut $f$ and also the nut $f'$.

Of course, many kinds of guide-rods or plans of guiding the nuts may be adopted, according to the designs and the requirements of special machines; or the machine may be used entirely without the guides if the driving-screw is divided, so that between the coarser and finer threads an arrangement is introduced by which the nut $f$ can follow the same circle as the point $g^2$ of the reeling-lever $g$ upon the axis $i$.

The screw $e$ being made with a coarser and finer thread is for the purpose of binding the screw to the nut $f'$, while the finer pitch accomplishes that motion for which the corkscrew is fixed. The hook $j'$ holds the nut $f$ at the mouth $c$ until the nut $f'$ has passed the incline at $j^2$. The nut $f'$ is provided with a corresponding incline at $f^2$, so that when the nut $f'$ has passed up the screw the hook is lifted, and when the nut $f$ is free from the hook it is then free to follow, the screw having ceased turning because the nut $f'$ has reached the head of the screw. The nuts now continue their motion, the corkscrew having been previously forced home, as explained, and the cork is drawn.

These machines may be constructed to work either horizontally, vertically, or at any desired angle, and may be fixed in any position. They may be made in several parts, from either brass, iron, zinc, or any other known metal capable of being worked or cast into the necessary shapes. The outer shape or design may also be varied to meet any requirements or taste, independent of the one shown on the drawings, only to answer the purpose for which they are intended.

It will thus be seen that by a double-threaded screw and nuts, in combination with the hooks, which very simply catch and relieve the nut, as also the lever $g$, with its curved slot, I obtain new results which will be most useful in reducing labor and in securing greater safety.

Having now described my invention of an improved machine for drawing corks, I would have it understood that I do not confine myself to the exact design of the machine, as it may be greatly varied according to taste and the position of the machine when fixed; but What I do claim is—

The combination, with the double-threaded screw and nuts $ff'$, of the lever $g$ and hand-lever K, substantially as described, whereby upon rocking said lever the screw is inserted in the cork and then bodily withdrawn, as and for the purpose set forth.

In testimony that I claim the foregoing as my own I affix my signature in the presence of two witnesses.

ANDREW MUIR.

Witnesses:
 JOSEPH H. PEARSON,
 GEORGE BARKER.